United States Patent
Sugiki

(10) Patent No.: US 8,564,908 B2
(45) Date of Patent: Oct. 22, 2013

(54) FLUID DYNAMIC BEARING UNIT AND DISK DRIVE DEVICE INCLUDING THE SAME

(71) Applicant: Samsung Electro-Mechanics Japan Advanced Technology Co., Ltd., Shizuoka (JP)

(72) Inventor: Ryusuke Sugiki, Shizuoka-ken (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

(21) Appl. No.: 13/891,243

(22) Filed: May 10, 2013

(65) Prior Publication Data

US 2013/0242433 A1    Sep. 19, 2013

Related U.S. Application Data

(62) Division of application No. 13/629,711, filed on Sep. 28, 2012, which is a division of application No. 13/332,851, filed on Dec. 21, 2011, now Pat. No. 8,441,759, which is a division of application No. 12/453,208, filed on May 1, 2009, now Pat. No. 8,107,195.

(51) Int. Cl.
*G11B 5/60* (2006.01)

(52) U.S. Cl.
USPC .......................................................... 360/224

(58) Field of Classification Search
USPC .......................................................... 360/224
See application file for complete search history.

(56) References Cited

U.S. PATENT DOCUMENTS

| | | | |
|---|---|---|---|
| 5,533,811 A | 7/1996 | Polch et al. | |
| 5,791,785 A | 8/1998 | Nose et al. | |
| 5,806,987 A | 9/1998 | Nose et al. | |
| 6,246,136 B1 | 6/2001 | Ichiyama | |
| 6,271,612 B1 | 8/2001 | Tanaka et al. | |
| 6,787,954 B2 * | 9/2004 | Yoshitsugu et al. | 310/90 |
| 7,648,281 B2 * | 1/2010 | Obara et al. | 384/107 |

(Continued)

FOREIGN PATENT DOCUMENTS

| | | |
|---|---|---|
| JP | 2006-064171 A | 9/2006 |
| JP | 2008-306756 A | 12/2008 |
| WO | 96/25606 | 8/1996 |

OTHER PUBLICATIONS

Exr. Syuichiro Yazawa, Japanese Office Action re: Japanese Patent Application No. 2009-209030, mailed Mar. 27, 2013 (5 pgs), including an English translation thereof. (7 pgs).

*Primary Examiner* — Hoai V Ho
*Assistant Examiner* — Pablo Huerta
(74) *Attorney, Agent, or Firm* — Louis Woo

(57) ABSTRACT

A first sleeve rotatably extends around a shaft. First and second flanges are fixed to the shaft. A second sleeve extending around the first sleeve is fixed thereto. A first annular member fixed to the second sleeve surrounds the first flange. A second annular member fixed to the second flange surrounds a portion of the second sleeve. A first capillary seal includes a clearance between the first flange and the first annular member. A second capillary seal includes a clearance between the second annular member and the second sleeve. Lubricant is provided in the clearances in the first and second capillary seals. The second annular member and the second sleeve are designed so that the lubricant in the clearance in the second capillary seal can be viewed from a point in a radial position which is outward of the second sleeve as seen in an axial direction.

20 Claims, 6 Drawing Sheets

(56) References Cited

U.S. PATENT DOCUMENTS

| | | | |
|---|---|---|---|
| 8,345,379 B2* | 1/2013 | Maeda et al. | 360/99.08 |
| 2008/0029574 A1 | 2/2008 | Shelton et al. | |
| 2009/0092347 A1* | 4/2009 | Ito et al. | 384/119 |
| 2009/0140587 A1 | 6/2009 | Popov et al. | |
| 2009/0297078 A1* | 12/2009 | Hori et al. | 384/107 |
| 2010/0321823 A1 | 12/2010 | Oe et al. | |

* cited by examiner

FLUID DYNAMIC BEARING UNIT AND DISK DRIVE DEVICE INCLUDING THE SAME

CROSS REFERENCE TO RELATED APPLICATIONS

This application is a divisional of application Ser. No. 13/629,711, filed Sep. 28, 2012, which in turn is a divisional of application Ser. No. 13/332,851, filed Dec. 21, 2011, now U.S. Pat. No. 8,441,759, which in turn is a divisional of application Ser. No. 12/453,208, filed May 1, 2009, now U.S. Pat. No. 8,107,195.

BACKGROUND OF THE INVENTION

1. Field of the Invention

This invention relates to a fluid dynamic bearing unit and a drive device for a recording disk. In addition, this invention relates to a method of manufacturing a fluid dynamic bearing unit.

2. Description of the Related Art

In recent years, disk drive devices such as HDDs have included fluid dynamic bearing units (abbreviated to FDBs) to enhance disk drive performances. Generally, a disk drive device capable of rotating a recording disk at a higher speed is desired. In a conventional disk drive device for magnetically recording data on a recording disk, the speed of rotation of the disk is 3600 $min^{-1}$. Recent disk drive devices rotate recording disks at a speed of 5400 $min^{-1}$ or 7200 $min^{-1}$.

In a disk drive device, higher-speed rotation of a recording disk causes greater unwanted vibration of a magnetic head which disturbs the tracing of a recording track by the magnetic head. A known disk drive structure designed as a countermeasure for this problem includes an FDB having a shaft, one end of which is fixed to a base. In the known structure, the shaft less vibrates so that the tracing of a recording track by a magnetic head can be prevented from being unacceptably disturbed.

Such a disk drive structure typically includes two capillary seals provided at two ends or sides of an FDB respectively. When lubricant is injected into the FDB via one of the capillary seals, air bubbles tend to be drawn thereinto via the other capillary seal. The lubricant can not easily move into a narrow clearance in the FDB. Therefore, charging the FDB with the lubricant tends to take a long time. During a longer-time charging process, more air bubbles are drawn into the FDB. Air bubbles in the FDB reduce bearing stiffness. A reduction in bearing stiffness may cause an FDB malfunction. In the event that the amount of the lubricant in the FDB is insufficient, the life of the FDB may be short. Accordingly, it is desirable to check the amount of the lubricant in the FDB.

PCT application publication number WO 96/25606 discloses a hydrodynamic bearing which takes a cylindrical shape. The hydrodynamic bearing has a stationary shaft, one end of which is coupled to a thrust plate forming a part of a base. The hydrodynamic bearing has two capillary seals at two ends thereof. One of the capillary seals is inverted while the other is non-inverted. The two capillary seals have upwardly-facing open ends respectively.

SUMMARY OF THE INVENTION

It is a first object of this invention to provide a fluid dynamic bearing unit designed so that charging the unit with lubricant can be easily performed in a short time, and air bubbles can be prevented from being drawn into the unit, and that the amount of the lubricant in the unit can be easily checked.

It is a second object of this invention to provide a disk drive device including the foregoing fluid dynamic bearing unit.

It is a third object of this invention to provide a method of manufacturing the foregoing fluid dynamic bearing unit.

A first aspect of this invention provides a fluid dynamic bearing unit comprising a shaft; a first sleeve accommodating at least a portion of the shaft and being rotatable relative to the shaft; a first flange fixed to the shaft and spaced from a first end surface of the first sleeve; a second flange fixed to the shaft and spaced from a second end surface of the first sleeve opposite to the first end surface thereof; a second sleeve fixed to the first sleeve and extending around the first sleeve; a first annular member fixed to a first end of the second sleeve and surrounding the first flange; a second annular member fixed to the second flange and surrounding a portion of the second sleeve; a pair of radial dynamic pressure grooves provided in at least one of an outer circumferential surface of the shaft and an inner circumferential surface of the first sleeve and spaced in an axial direction; a first thrust dynamic pressure groove provided in at least one of the first flange and the first end surface of the first sleeve; a second thrust dynamic pressure groove provided in at least one of the second flange and the second end surface of the first sleeve; a first capillary seal including a first clearance between the first flange and the first annular member and having a first open end, wherein the first clearance at a first position is wider as the first position moves toward the first open end; a second capillary seal including a second clearance between the second annular member and the portion of the second sleeve and having a second open end, wherein the second clearance at a second position is wider as the second position moves toward the second open end; and lubricant provided in the radial dynamic pressure grooves, the first and second thrust dynamic pressure grooves, and the first and second capillary seals; wherein the second annular member and the second sleeve are designed so that the lubricant in the second clearance in the second capillary seal can be viewed from a point in a radial position which is outward of the second sleeve as seen in an axial direction.

A second aspect of this invention is based on the first aspect thereof, and provides a fluid dynamic bearing unit wherein the second sleeve and the first annular member are integral with each other.

A third aspect of this invention is based on the first aspect thereof, and provides a fluid dynamic bearing unit wherein the second flange and the second annular member are integral with each other.

A fourth aspect of this invention is based on the first aspect thereof, and provides a fluid dynamic bearing unit wherein an outer circumferential surface of the second sleeve has a recessed area defining a portion of the second capillary seal.

A fifth aspect of this invention is based on the first aspect thereof, and provides a fluid dynamic bearing unit wherein a radial position of the second capillary seal is outward of that of the first capillary seal as seen in an axial direction.

A sixth aspect of this invention is based on the first aspect thereof, and provides a fluid dynamic bearing unit wherein the second capillary seal extends around one of the radial dynamic pressure grooves.

A seventh aspect of this invention is based on the first aspect thereof, and provides a fluid dynamic bearing unit wherein at least one of the first and second annular members has an inner circumferential surface which is tapered in an inward direction.

An eighth aspect of this invention is based on the first aspect thereof, and provides a fluid dynamic bearing unit further comprising a communication passage including an axial groove formed in at least one of the first sleeve and the second sleeve.

A ninth aspect of this invention is based on the eighth aspect thereof, and provides a fluid dynamic bearing unit wherein the first flange radially extends to a position which is outward of a radial position of an end of the communication passage as seen in an axial direction.

A tenth aspect of this invention is based on the first aspect thereof, and provides a fluid dynamic bearing unit wherein an outside diameter of the first annular member is smaller than that of the second annular member.

An eleventh aspect of this invention is based on the first aspect thereof, and provides a fluid dynamic bearing unit wherein a volume of the second capillary seal is equal to 70%-130% of that of the first capillary seal.

A twelfth aspect of this invention is based on the first aspect thereof, and provides a fluid dynamic bearing unit wherein the second flange and the second sleeve define a third clearance therebetween, and the second capillary seal includes the third clearance.

A thirteenth aspect of this invention is based on the first aspect thereof, and provides a fluid dynamic bearing unit wherein the second flange is formed by pressing.

A fourteenth aspect of this invention is based on the first aspect thereof, and provides a fluid dynamic bearing unit wherein the first sleeve and the second sleeve are integral with each other.

A fifteenth aspect of this invention is based on the first aspect thereof, and provides a fluid dynamic bearing unit wherein the first capillary seal and the second capillary seal are designed so that the lubricant in the first clearance in the first capillary seal and the lubricant in the second clearance in the second capillary seal can be viewed from a substantially same point in a radial position which is outward of the second sleeve as seen in an axial direction.

A sixteenth aspect of this invention provides a disk drive device comprising a fluid dynamic bearing unit, a hub connected with the fluid dynamic bearing unit, and a base connected with the fluid dynamic bearing unit. The fluid dynamic bearing unit comprises a shaft fixed to the base; a first sleeve accommodating at least a portion of the shaft and being rotatable relative to the shaft; a first flange fixed to the shaft and spaced from a first end surface of the first sleeve; a second flange fixed to the shaft and spaced from a second end surface of the first sleeve opposite to the first end surface thereof; a second sleeve fixed to the first sleeve and extending outward of the first sleeve, the second sleeve being securely connected with the hub; a first annular member fixed to a first end of the second sleeve and surrounding the first flange; a second annular member fixed to the second flange and surrounding a portion of the second sleeve; a pair of radial dynamic pressure grooves provided in at least one of an outer circumferential surface of the shaft and an inner circumferential surface of the first sleeve and spaced in an axial direction; a first thrust dynamic pressure groove provided in at least one of the first flange and the first end surface of the first sleeve; a second thrust dynamic pressure groove provided in at least one of the second flange and the second end surface of the first sleeve; a first capillary seal including a first clearance between the first flange and the first annular member and having a first open end, wherein the first clearance at a first position is wider as the first position moves toward the first open end; a second capillary seal including a second clearance between the second annular member and the portion of the second sleeve and having a second open end, wherein the second clearance at a second position is wider as the second position moves toward the second open end; and lubricant provided in the radial dynamic pressure grooves, the first and second thrust dynamic pressure grooves, and the first and second capillary seals; wherein the second annular member and the second sleeve are designed so that the lubricant in the second clearance in the second capillary seal can be viewed from a point in a radial position which is outward of the second sleeve as seen in an axial direction.

A seventeenth aspect of this invention is based on the sixteenth aspect thereof, and provides a disk drive device further comprising a coil disposed in a space between the hub and the base, the hub having a portion axially aligning with the coil, the base having a portion axially aligning with the coil, wherein the portion of the hub is greater in axial dimension than the portion of the base.

An eighteenth aspect of this invention is based on the sixteenth aspect thereof, and provides a disk drive device wherein the shaft has a portion directly connected with the base, and an axial dimension of the portion of the shaft is equal to 20% or more of an overall axial length of the shaft.

A nineteenth aspect of this invention is based on the sixteenth aspect thereof, and provides a disk drive device wherein the hub has an inner surface including a tapered surface.

A twentieth aspect of this invention is based on the sixteenth aspect thereof, and provides a disk drive device further comprising a cover member concealing the first open end of the first capillary seal.

A twenty-first aspect of this invention is based on the twentieth aspect of this invention, and provides a disk drive device wherein the cover member and the hub are integral with each other.

A twenty-second aspect of this invention provides a method of manufacturing a fluid dynamic bearing unit which comprises the steps of fixing a first flange to an outer circumferential surface of an end of a shaft; fixing an outer circumferential surface of a first sleeve to an inner circumferential surface of a second sleeve with a first annular member, wherein radial dynamic pressure grooves are formed between the first and second sleeves, and first and second thrust dynamic pressure grooves are formed in end surfaces of the first sleeve; inserting an end of the shaft which is remote from the first flange into a central bore of the first sleeve until the first flange and the first annular member are radially opposed to each other and said end of the shaft moves out of the central bore of the first sleeve, wherein a predetermined clearance for a first capillary seal is defined between the first flange and the first annular member; fixing a second flange with a second annular member to the shaft at a position such that an outer circumferential surface of an end of the second sleeve and an inner circumferential surface of the second annular member are opposed to each other, and thereby obtaining a fluid dynamic bearing unit without lubricant, wherein a predetermined clearance for a second capillary seal is defined between the second sleeve and the second annular member; placing the fluid dynamic bearing unit without lubricant in a vacuum chamber; applying lubricant to first and second portions of the fluid dynamic bearing unit without lubricant in the vacuum chamber, the first portion including a region adjoining the clearance between the first flange and the first annular member, the second portion including a region adjoining the clearance between the second sleeve and the second annular member; introducing air into the vacuum chamber and moving the applied lubricant into the fluid dynamic bearing unit without lubricant by the introduced air so that the lubricant occupies the radial dynamic pressure grooves, the first and second thrust dynamic pressure grooves, at least a deep portion of the clearance between the first flange and the first annular member for the first capillary seal, and at least a deep portion of the clearance between the second sleeve and the second annular member for the second capillary seal, wherein the first and second capillary seals have open ends designed to allow surfaces of the lubricant in the first and second capillary seals to be viewed from a substantially same point in a radial position which is outward of the second sleeve as seen in an axial direction; and checking positions of surfaces of the lubricant in the first and second capillary seals while optically accessing the surfaces of the lubricant through the open ends of the first and second capillary seals.

This invention has the following advantages. The lubricant is injected into the fluid dynamic bearing unit simultaneously via the clearances of the first and second capillary seals. Therefore, the injection of the lubricant into the fluid dynamic bearing unit can be easily performed and be completed in a short time. Furthermore, it is possible to prevent air bubbles from being drawn into the fluid dynamic bearing unit during the injection of the lubricant thereinto. In addition, it is easy to check the amount of the lubricant in the fluid dynamic bearing unit.

DETAILED DESCRIPTION OF THE INVENTION

Figure 1A:
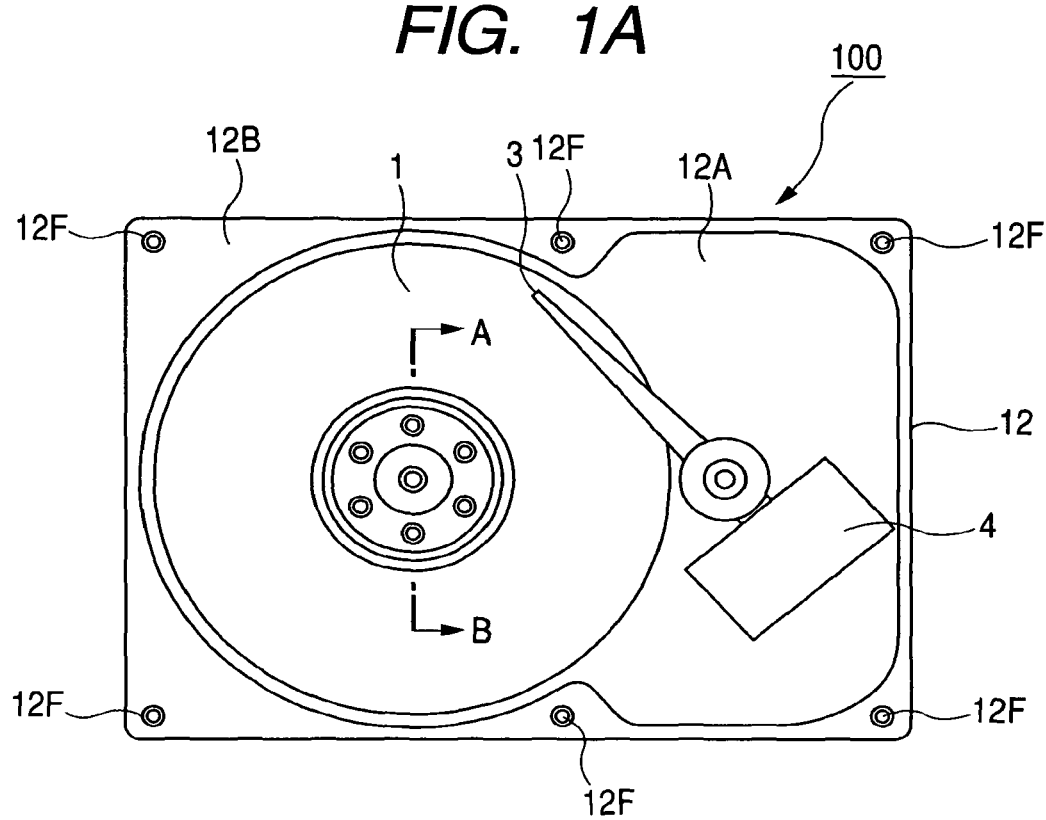
FIG. 1A is a top view of a disk drive device in an embodiment of this invention with a top cover removed for showing an internal structure of the device.
Figure 1B:
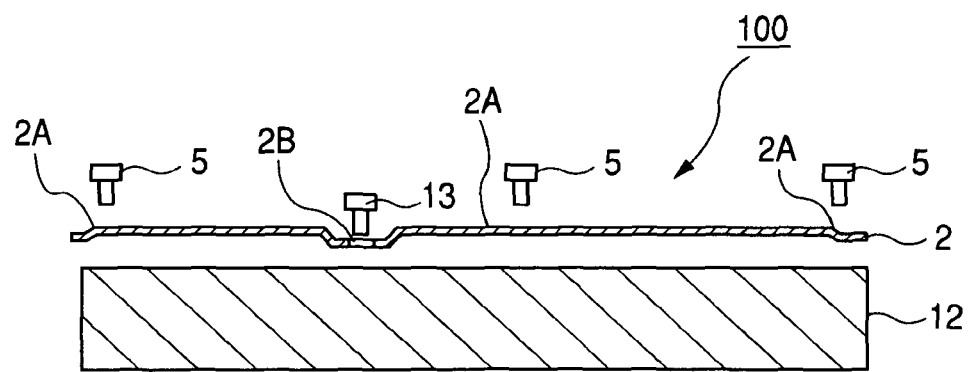
FIG. 1B is a side view of the disk drive device in FIG. 1A.
Figure 2:
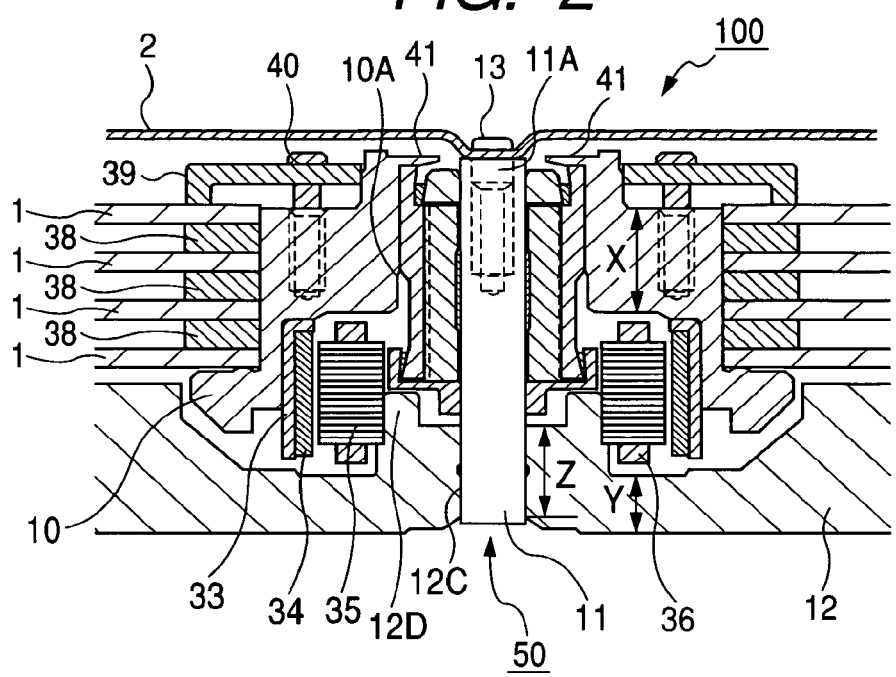
FIG. 2 is a sectional view of a main portion of the disk drive device which is taken along the A-B line of FIG. 1A.

With reference to FIGS. 1A, 1B, and 2, a disk drive device 100 in an embodiment of this invention includes a top cover 2, a base 12, and a fluid dynamic bearing unit (FDB) 50.

The FDB 50 takes an approximately cylindrical body, and includes a columnar shaft 11 coaxial with and centered at the body. One end (the lower end in FIG. 2) of the shaft 11 is fixed to the base 12. The other end (the upper end in FIG. 2) of the shaft 11 is formed with an axially-extending threaded hole 11A. The other end of the shaft 11 is fixed to the top cover 2 by a screw 13 having a head in contact with the top cover 2 and extending into the threaded hole 11A to engage with the shaft 11.

Figure 3:
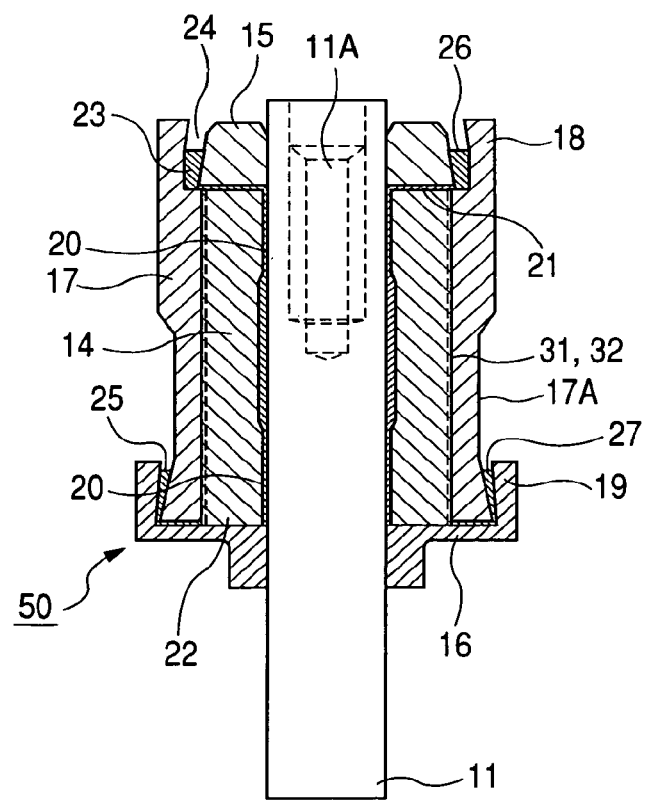
FIG. 3 is a longitudinal section view of a fluid dynamic bearing unit (FDB) in the disk drive device of FIGS. 1A, 1B, and 2.

As best shown in FIG. 3, the FDB 50 includes the shaft 11, a first sleeve 14, a first flange 15, a second flange 16, a second sleeve 17, a first annular member 18, and a second annular member 19 substantially coaxial with each other. The first and second sleeves 14 and 17 are approximately cylindrical. The first sleeve 14 is made of, for example, a cupper-based alloy, and is formed by, for example, cutting or machining. The shaft 11 is made of, for example, stainless steel such as SUS420J, and is formed by, for example, cutting or machining. The first sleeve 14 coaxially accommodates an intermediate part of the shaft 11. The first sleeve 14 can rotate about the shaft 11. There is a clearance between the first sleeve 14 and the shaft 11.

A pair of grooves 20 for radial dynamic pressure are formed in at least one of the inner circumferential surface of the first sleeve 14 and the outer circumferential surface of the shaft 11. Thus, the radial dynamic pressure grooves 20 are defined between the first sleeve 14 and the shaft 11. The radial dynamic pressure grooves 20 are spaced in the axial direction, and take, for example, a herringbone shape or pattern.

The first flange 15 is fixed to one end (the upper end in FIG. 3) of the shaft 11 by, for example, pressing. The first flange 15 coaxially extends around the shaft 11. One end surface of the first sleeve 14 and one end surface of the first flange 15 are opposed to each other while being spaced from each other by a clearance. A first groove 21 for thrust dynamic pressure is formed in at least one of the opposed end surfaces of the first sleeve 14 and the first flange 15. Thus, the first thrust dynamic pressure groove 21 is defined between the first sleeve 14 and the first flange 15. The first thrust dynamic pressure groove 21 takes, for example, a spiral shape or a herringbone shape (pattern).

The second flange 16 is fixed to the shaft 11 by, for example, pressing. The second flange 16 coaxially extends around the shaft 11. The other end surface of the first sleeve 14 and one end surface of the second flange 16 are opposed to each other while being spaced from each other by a clearance.

A second groove 22 for thrust dynamic pressure is formed in at least one of the opposed end surfaces of the first sleeve 14 and the second flange 16. Thus, the second thrust dynamic pressure groove 22 is defined between the first sleeve 14 and the second flange 16. The second thrust dynamic pressure groove 22 takes, for example, a spiral shape or a herringbone shape (pattern).

The second sleeve 17 coaxially accommodates the first sleeve 14, and is fixed thereto by, for example, bond. The first annular member 18 is fixed to an end surface of the second sleeve 17 which is close to the first flange 15. The first annular member 18 coaxially surrounds the first flange 15. There is a cylindrical clearance between the first flange 15 and the first annular member 18. The first flange 15 and the first annular member 18 form a first capillary seal 24 including the foregoing clearance. The first capillary seal 24 has an open end (an upper end in FIG. 3). The clearance in the first capillary seal 24 is tapered such that the cross section of the clearance at an axial position is wider as the axial position moves toward the open end of the seal 24. In FIG. 3, the open end of the first capillary seal 24 faces axially upward. The first capillary seal 24 exhibits capillary action and thereby prevents leakage of lubricant 23 from the FDB 50.

The second annular member 19 is coaxially fixed to an outer circumferential edge of the second flange 16. The second annular member 19 coaxially surrounds an end portion (a lower end portion in FIG. 3) of the second sleeve 17. There is a cylindrical clearance between the second annular member 19 and the end portion of the second sleeve 17. The second annular member 19 and the end portion of the second sleeve 17 form a second capillary seal 25 including the foregoing clearance. The second capillary seal 25 has an open end (an upper end in FIG. 3). The clearance in the second capillary seal 25 is tapered such that the cross section of the clearance at an axial position is wider as the axial position moves toward the open end of the seal 25. In FIG. 3, the open end of the second capillary seal 25 faces axially upward. The second capillary seal 25 exhibits capillary action and thereby prevents leakage of the lubricant 23 from the FDB 50.

The radial dynamic pressure grooves 20, the first and second thrust dynamic pressure grooves 21 and 22, and the clearances in the first and second capillary seals 24 and 25 communicate with each other, and form a continuous space charged with the lubricant 23. There is a first surface 26 of the lubricant 23 (that is, an interface between the lubricant 23 and air) at a midway position within the clearance of the first capillary seal 24. There is a second surface 27 of the lubricant 23 (that is, an interface between the lubricant 23 and air) at a midway position within the clearance of the second capillary seal 25. The second annular member 19 and the second sleeve 17 are shaped and relatively arranged so that the lubricant 23 in the clearance of the second capillary seal 25 can be viewed from a point in a radial position outward of the second sleeve 17 as seen in the axial direction via the open end of the second capillary seal 25. Thus, a straight path of light propagation can extend from the above-indicated view point to the lubricant 23 in the clearance of the second capillary seal 25 through the open end thereof without meeting the walls of the body of the FDB 50. In this case, it is easy to optically check the position of the surface 27 of the lubricant 23 in the second capillary seal 25 from that view point. With reference to FIG. 3, the outer circumferential surface of the second sleeve 17 may have a recess 17A located immediately above the open end of the second capillary seal 25 for ensuring an optical access to the lubricant 23 in the second capillary seal 25 from the above-indicated view point. Preferably, the first and second capillary seals 24 and 25 are designed so that the lubricant surfaces 26 and 27 can be viewed in a substantially same direction or viewed from a substantially same point whose radial position is outward of the outer circumference of the second sleeve 17 as seen in the axial direction via the open ends of the seals 24 and 25. In FIG. 3, this view point is, for example, axially and upwardly distant from the first and second capillary seals 24 and 25, and is radially distant from the axis of the shaft 11. The lubricant surfaces 26 and 27 in the first and second capillary seals 24 and 25 can be optically accessed from the above-indicated view point via the open ends of the seals 24 and 25. In other words, straight paths for light propagation can extend from that view point to the lubricant surfaces 26 and 27 in the first and second capillary seals 24 and 25 through the open ends thereof without meeting the walls of the body of the FDB 50. Accordingly, both the lubricant surfaces 26 and 27 in the first and second capillary seals 24 and 25 can be checked by an optical position-detecting device or an optical distance-measuring device located at the above-indicated view point. An example of the optical distance-measuring device is a laser distance-measuring device.

The FDB 50 is manufactured in a method including an assembling procedure and a lubricant injecting procedure. The FDB 50 is assembled and the lubricant 23 is injected or impregnated thereinto by a sequence of steps (1)-(9) mentioned below.

Figure 4A:
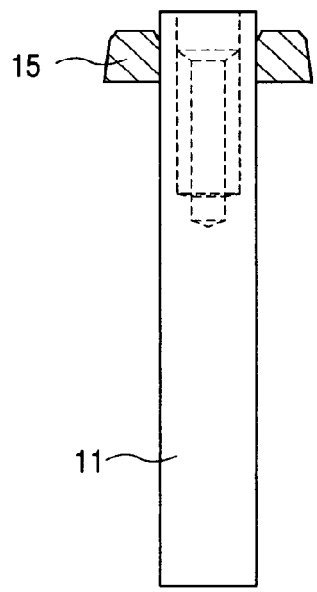
FIG. 4A is a longitudinal section view of a combination of FDB parts in a state where a first flange is fixed to a shaft during the manufacture of the FDB.

(1) With reference to FIG. 4A, a shaft 11 and a first flange 15 are prepared. An end of the shaft 11 has a threaded hole (the threaded hole 11A in FIGS. 2 and 3). The first flange 15 is fixed to the outer circumferential surface of this end of the shaft 11 at a predetermined position by, for example, pressing.

Figure 4B:
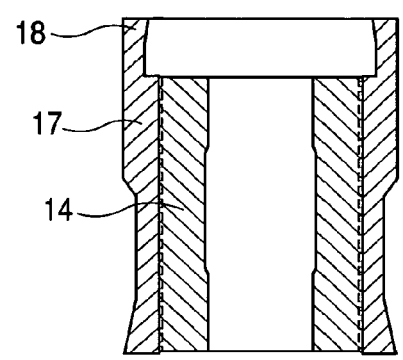
FIG. 4B is a longitudinal section view of a combination of FDB parts in a state where a first sleeve and a second sleeve are fixed to each other during the manufacture of the FDB.

(2) With reference to FIG. 4B, a first sleeve 14 taking a predetermined shape is prepared. Radial dynamic pressure grooves 20 are formed in the inner circumferential surface of the first sleeve 14. First and second thrust dynamic pressure grooves 21 and 22 are formed in the end surfaces of the first sleeve 14. Preferably, the formation of the grooves 20, 21, and 22 utilizes machining, etching, or processing. Thereafter, a second sleeve 17 is prepared. A first annular member 18 is fixed to an end surface of the second sleeve 17. The first sleeve 14 is fitted in the second sleeve 17 with the first annular member 18. The outer circumferential surface of the first sleeve 14 is fixed to the inner circumferential surface of the second sleeve 17 by, for example, bond.

Figure 4C:
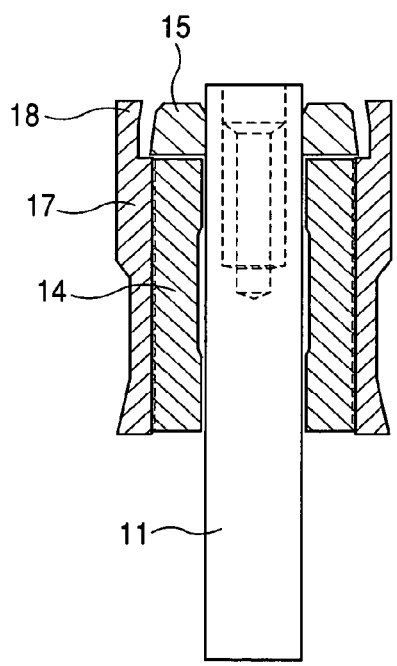
FIG. 4C is a longitudinal section view of a combination of FDB parts in a state where the shaft with the first flange is inserted into the second sleeve during the manufacture of the FDB.

(3) With reference to FIG. 4C, the end of the shaft 11 which is remote from the first flange 15 is inserted into the central bore of the first sleeve 14 until the first flange 15 and the first annular member 18 are radially opposed to each other and the end of the shaft 11 moves out of the central bore of the first sleeve 14. There is a predetermined clearance between the first flange 15 and the first annular member 18 for a first capillary seal 24.

Figure 4D:
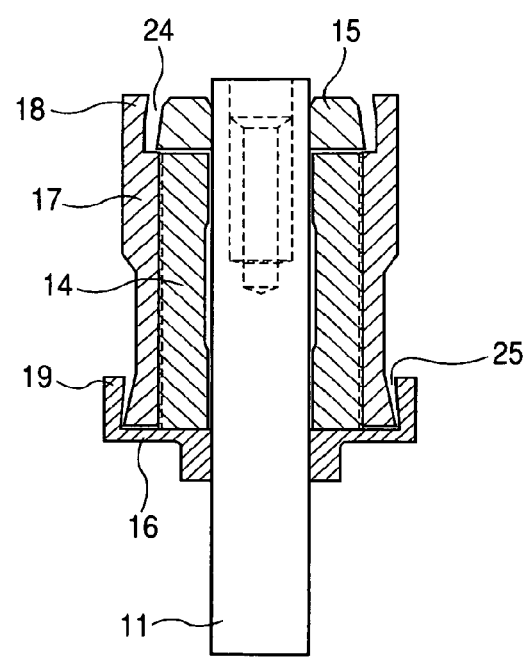
FIG. 4D is a longitudinal section view of a combination of FDB parts in a state where a second flange is fixed to the shaft during the manufacture of the FDB.

(4) With reference to FIG. 4D, a second flange 16 is prepared. A second annular member 19 is coaxially fixed to an outer circumferential edge of the second flange 16. The second flange 16 with the second annular member 19 is mounted on the exposed portion of the shaft 11 at a predetermined position such that the outer circumferential surface of an end of the second sleeve 17 and the inner circumferential surface of the second annular member 19 are opposed to each other. There is a predetermined clearance between the second sleeve 17 and the second annular member 19 for a second capillary seal 25. In this way, an FDB 50 without lubricant 23 is obtained.

Figure 4E:
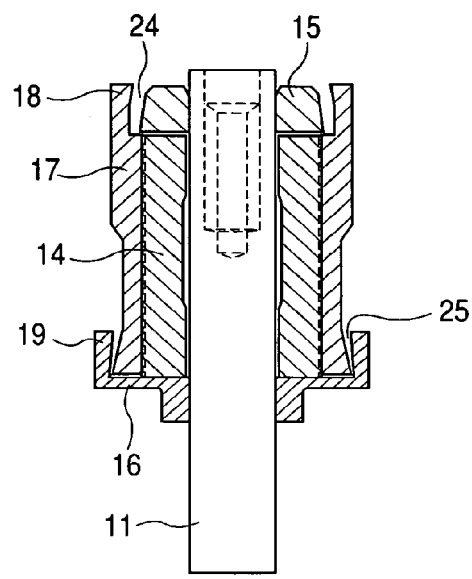
FIG. 4E is a longitudinal section view of a combination of FDB parts in a state where air is expelled from an interior of the combination during the manufacture of the FDB.

(5) With reference to FIG. 4E, the FDB 50 without lubricant 23 is placed in a vacuum chamber (not shown). The vacuum chamber is evacuated to remove air from the interior of the FDB 50. At this time, the pressure in the vacuum chamber is set to, for example, 100 Pa or less.

Figure 4F:
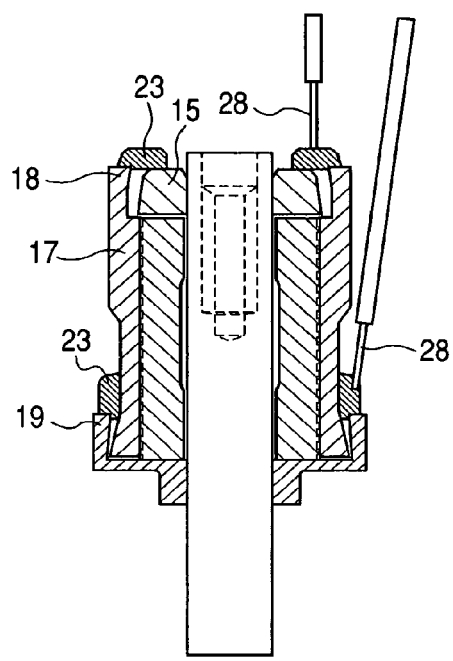
FIG. 4F is a longitudinal section view of a combination of FDB parts in a state where lubricant is applied to first and second portions of the combination which includes a region between the first flange and a first annular member, and a region between the second sleeve and a second annular member during the manufacture of the FDB.

(6) With reference to FIG. 4F, in the vacuum chamber, lubricant 23 is applied to first and second portions of the FDB 50 through the use of a nozzle or nozzles 28. The first portion includes a region adjoining the open end of the clearance between the first flange 15 and the first annular member 18 for the first capillary seal 24. The second portion includes a region adjoining the open end of the clearance between the second sleeve 17 and the second annular member 19 for the second capillary seal 25.

Figure 4G:
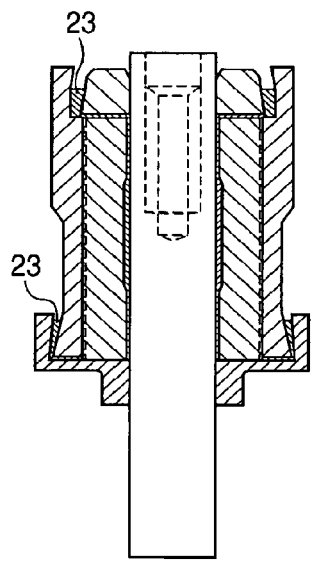
FIG. 4G is a longitudinal section view of a combination of FDB parts in a state where the lubricant is drawn into the interior of the combination during the manufacture of the FDB.

(7) With reference to FIG. 4G, air is introduced into the vacuum chamber to return the pressure therein to substantially the atmospheric pressure. The introduction of air develops a pressure difference moving the applied lubricant 23 into the FDB 50. As a result, the lubricant 23 occupies the radial dynamic pressure grooves 20, and the first and second thrust dynamic pressure grooves 21 and 22. Furthermore, the lubricant 23 occupies at least a deep portion of the clearance between the first flange 15 and the first annular member 18 for the first capillary seal 24 and at least a deep portion of the clearance between the second sleeve 17 and the second annular member 19 for the second capillary seal 25.

Figure 4H:
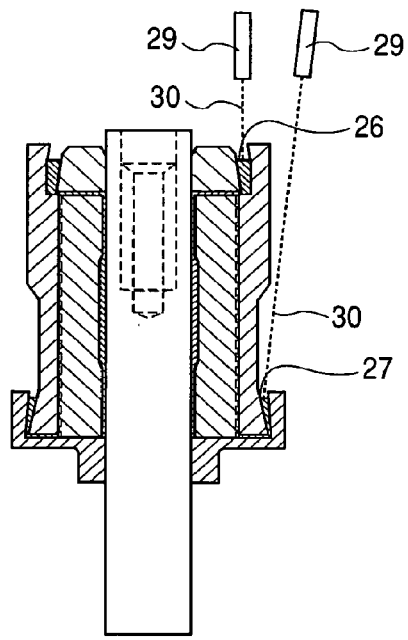
FIG. 4H is a longitudinal section view of a combination of FDB parts in a state where a laser beam is applied to interiors of first and second capillary seals to check the heights of lubricant surfaces in the first and second capillary seals during the manufacture of the FDB.

(8) With reference to FIG. 4H, the heights (positions) of the first and second surfaces 26 and 27 of the lubricant 23 in the first and second capillary seals 24 and 25 are detected through the use of a laser distance-measuring device 29. In this case, the laser distance-measuring device 29 applies a laser beam 30 to the first and second lubricant surfaces 26 and 27, and receives a reflected beam therefrom. A decision is made as to whether or not the detected heights of the first and second lubricant surfaces 26 and 27 are in respective predetermined ranges meaning desired ranges relative to the FDB body. When the detected heights of the first and second lubricant surfaces 26 and 27 are in the desired ranges, the FDB 50 is regarded as being completed.

(9) In the event that the detected heights of the first and second lubricant surfaces 26 and 27 are not in the desired ranges, the steps (5)-(8) are repeated to replenish the lubricant 23 in the FDB 50.

It should be noted that the step (6) may be modified as follows. The modified step (6) does not apply lubricant 23 to the second portion of the FDB 50 which includes the region adjoining the open end of the clearance between the second sleeve 17 and the second annular member 19 for the second capillary seal 25. In this case, during the step (7), air is drawn into the FDB 50 via the clearance between the second sleeve 17 and the second annular member 19 for the second capillary seal 25 so that a sufficient amount of the lubricant 23 is not moved into the FDB 50 through the clearance between the first flange 15 and the first annular member 18 for the first capillary seal 24. In addition, air bubbles tend to be drawn into the lubricant 23 within the FDB 50. To charge the FDB 50 sufficiently with the lubricant 23, the steps (5)-(8) are repeated a large number of times. Accordingly, sufficiently charging the FDB 50 with the lubricant 23 takes a long time, and the work efficiently of the charging is relatively low. In view of these points, it is preferable to apply lubricant 23 also to the second portion of the FDB 50 which includes the region adjoining the open end of the clearance between the second sleeve 17 and the second annular member 19 for the second capillary seal 25.

The second sleeve 17 and the first annular member 18 may be integral with each other. Furthermore, the second flange 16 and the second annular member 19 may be integral with each other. In these cases, the number of parts of the FDB 50 is smaller so that the efficiency of assembling the FDB 50 is higher.

Each of the second sleeve 17 and the first annular member 18 is made of a material selected from, for example, various metal materials and plastic materials. Preferably, each of the second sleeve 17 and the first annular member 18 is made of brass, and is formed by cutting or machining. In this case, it is possible to provide the advantage that the cutting or the machining is easy, and the accuracy thereof is high. The second sleeve 17 and the first annular member 18 may be plated. It is preferable to subject the second sleeve 17 and the first annular member 18 to electroless nickel plating since a high antirust effect and a high hardness are attained.

Each of the second flange 16 and the second annular member 19 is made of a material selected from, for example, various metal materials and plastic materials. Preferably, each of the second flange 16 and the second annular member 19 is made of stainless steel such as SUS303, and is formed by cutting or machining. In this case, it is possible to provide the advantage that the cutting or the machining is easy, and the accuracy thereof is high. Each of the second flange 16 and the second annular member 19 may be made of stainless steel such as SUS304, and may be formed by pressing. In this case, it is possible to provide the advantage that forming the second flange 16 and the second annular member 19 takes a short time.

As the outside diameter of the second capillary seal 25 is greater, the inside diameter of a stator core is greater and the developed rotational drive force is weaker. As best shown in FIG. 3, a radially-extending and circumferentially-extending recess 17A may be formed in the outer circumferential surface of the second sleeve 17. In this case, it is preferable to form the second capillary seal 25 at the outer circumferential surface of the second sleeve 17 which defines the recess 17A since the outside diameter of the resultant seal 25 is smaller.

In the case where the second capillary seal 25 extends radially inward of the first capillary seal 24 as seen in the axial direction, the nozzle 28 (see FIG. 4F) for applying lubricant 23 to the second portion of the FDB 50 tends to interfere with the first annular member 18. In view of this point, it is preferable that the second capillary seal 25 extends radially outward of the first capillary seal 24 as seen in the axial direction. In this case, it is possible to provide the advantage that as shown in FIG. 4F, the applications of lubricant 23 for the first and second capillary seals 24 and 25 can be implemented in similar directions respectively.

In the case where the second capillary seal 25 and the radial dynamic pressure groove 20 closer thereto occupy different places in the axial direction, the FDB 50 is axially thick. In view of this point, it is preferable to locate the second capillary seal 25 coaxially around the radial dynamic pressure groove 20. In this case, it is possible to provide the advantage that the FDB 50 is axially thin.

In operation of the FDB 50, the first and second sleeves 14 and 17 and the first annular member 18 rotate about the shaft 11 while moving relative to the first and second flanges 15 and 16 and the second annular member 19. During rotation of the first and second sleeves 14 and 17 and the first annular member 18, a centrifugal force is applied to the lubricant 23 in the FDB 50. Preferably, at least one of the inner circumferential surfaces of the first and second annular members 18 and 19 is tapered to prevent the escape of the lubricant 23 from the FDB 50 due to the applied centrifugal force. In this case, the taper is such that the inside diameter of the first or second annular member 18 or 19 at an axial position decreases as the axial position moves toward the open end of the first or second capillary seal 24 or 25. In view of the lubricant-escape-preventing performance and the easy formation of the first and second annular members 18 and 19, a preferable range of the angle of the taper in at least one of the inner circumferential surfaces of the members 18 and 19 is between 0.5° and 10°. A more preferable range is between 3° and 8°.

Preferably, an axially-extending communication passage 32 is provided in the first sleeve 14 or at the boundary between the first and second sleeves 14 and 17. The ends of the communication passage 32 open at the end surfaces of the first sleeve 14 or at the ends of the boundary between the first and second sleeves 14 and 17. The communication passage 32 connects the lubricant containing regions partially defined by the two end surfaces of the first sleeve 14. The communication passage 32 is filled with the lubricant 23. Accordingly, the communication passage 32 reduces the difference between the pressures applied to the two end surfaces of the first sleeve 14.

The communication passage 32 may include an axially-extending groove 31 formed in at least one of the outer circumferential surface of the first sleeve 14 and the inner circumferential surface of the second sleeve 17. In this case, it is easy to remove burrs caused during the formation of the groove 31.

Preferably, the outer circumference of the first flange 15 extends radially outward of the nearby open end of the communication passage 32 as seen in the axial direction. In this case, the first flange 15 blocks the movement of the lubricant 23 from the communication passage 32 when a shock is applied to the FDB 50. For example, the outside diameter of the first flange 15 is greater than that of the first sleeve 14.

In the case where the outside diameter of the first annular member 18 is greater than that of the second annular member 19, the laser beam 30 tends to interfere with the first annular member 18 during an attempt to check the lubricant surface 27 in the second capillary seal 25 at the step (8) of FIG. 4H. Preferably, the outside diameter of the first annular member 18 is smaller than that of the second annular member 19. In this case, it is easy to check the lubricant surface 27 in the second capillary seal 25.

When the lubricant 23 disappears from the first or second capillary seal 24 or 25 due to evaporation, the life of the FDB 50 expires. A smaller initial amount of the lubricant in the first or second capillary seal 24 or 25 causes a shorter life of the FDB 50. Preferably, the lubricant-containing volume or capacity of the second capillary seal 25 is equal to 70%-130% of that of the first capillary seal 24. In this case, equal amounts of lubricant 23 are discharged from equal-size nozzles 28 onto the first and second portions of the FDB 50 respectively at the step (6) of FIG. 4F. Accordingly, it is easy to manage the applied amounts of lubricant 23. It should be noted that an error in the applied amounts of lubricant 23 is generally equal to ±30% even when the equal-size nozzles 28 are used.

A greater lubricant-containing volume (capacity) of the second capillary seal 25 is desirable. The second capillary seal 25 may include the clearance defined between the opposed surfaces of the second flange 16 and the second sleeve 17. In this case, a greater lubricant-containing volume of the second capillary seal 25 is obtained.

Preferably, the surface of the second flange 16 which opposes the nearby end surface of the second sleeve 17 is flat. Preferably, the end surface of the second sleeve 17 which opposes the nearby surface of the second flange 16 is tapered such that the clearance therebetween at a radial position is wider as the radial position moves outward. The clearance between the opposing surfaces of the second flange 16 and the second sleeve 17 is filled with the lubricant 23. This clearance also exhibits capillary action that prevents leakage of the lubricant 23 from the FDB 50. The clearance between the second sleeve 17 and the second annular member 19 and the clearance between the second flange 16 and the second sleeve 17 constitute an interior of the second capillary seal 25.

The first sleeve 14 and the second sleeve 17 may be integral with each other. In this case, parts of the FDB 50 can be made by fewer steps. Each of the first and second sleeves 14 and 17 is made of a material selected from, for example, various metal materials and plastic materials. Preferably, each of the first and second sleeves 14 and 17 is made of brass, and is formed by cutting or machining. In this case, it is possible to provide the advantage that the cutting or the machining is easy, and the accuracy thereof is high. The first and second sleeves 14 and 17 may be plated. It is preferable to subject the first and second sleeves 14 and 17 to electroless nickel plating since a high antirust effect and a high hardness are attained.

With reference back to FIGS. 1A, 1B, and 2, the disk drive device 100 includes a hub 10, the base 12, and the FDB 50. The hub 10 is separate from the second sleeve 17 of the FDB 50. The hub 10 has a central bore in which at least a part of the FDB 50 is placed. The base 12 is separate from the second flange 16 of the FDB 50.

The hub 10 is made of, for example, aluminum, and is formed by, for example, cutting or machining. The hub 10 has an outer circumferential surface including first and second cylindrical portions. In FIG. 2, the first cylindrical portion of the hub 10 coaxially extends below the second cylindrical portion thereof. The first cylindrical portion of the hub 10 engages with the inner circumference of a recording disk 1 or the inner circumferences of recording disks 1. The second cylindrical portion of the hub 10 engages with the inner circumference of a clamper 39. One end (the lower end in FIG. 2) of the hub 10 near the first cylindrical portion may have an outwardly-projecting annular ledge or shelf.

The hub 10 has an inner circumferential surface including third and fourth cylindrical portions. The diameter of the fourth cylindrical portion of the hub 10 is greater than that of the third cylindrical portion thereof. In FIG. 2, the fourth cylindrical portion of the hub 10 coaxially extends below the third cylindrical portion thereof. The third cylindrical portion of the hub 10 defines the central bore thereof into which the FDB 50 extends. The third cylindrical portion of the hub 10 is fixed to the outer circumferential surface of the second sleeve 17 in the FDB 50 by, for example, bond. The outer circumferential surface of a cylindrical yoke 33 is fixed to the fourth cylindrical portion of the hub 10 by, for example, pressing and bond. The yoke 33 is made of, for example, a soft-magnetic steel sheet, and is formed by, for example, pressing. The yoke 33 may be plated to prevent corrosion.

A ring-shaped magnet 34 is coaxially fixed to the inner circumferential surface of the yoke 33. The magnet 34 is made of, for example, a material containing a rare-earth material such as Nd—Fe—B (neodymium-iron-boron). The magnet 34 may have, for example, eight driving-purpose magnetic poles spaced along the circumferential direction of the inner circumferential surface thereof.

The base 12 may have a recess 12A and a wall portion 12B defining the edge of the recess 12A. The base 12 is made of, for example, aluminum, and is formed by, for example, die casting to produce an intermediate member and cutting or machining the intermediate member into a desired shape. It is preferable to provide an electrodeposition coat on the surface of the base 12 since the coat prevents dust from falling off from the exposed base surface.

The base 12 has a hole 12C and an annular wall portion 12D extending around the hole 12C. The hole 12C is located in a central portion of the base 12. A stator core 35 is fixed to the outer circumferential surface of the annular wall portion 12D by, for example, bond. The stator core 35 may have a circular ring and twelve projections radially extending from the circular ring. The projections of the stator core 35 are provided with a 3-phase coil 36 formed by windings. The end of the shaft 11 of the FDB 50 which is close to the second flange 16 fits into the hole 12C of the base 12, and is fixed to the base 12 by, for example, bond.

The inner circumferential surface of the magnet 34 and the outer circumferential surface of the stator core 35 are opposed to each other. There is a clearance of, for example, 0.5 mm between the inner circumferential surface of the magnet 34 and the outer circumferential surface of the stator core 35. The coil 36 is electrically connected with a given drive circuit (not shown). When the drive circuit causes a 3-phase approximately-sinusoidal current to flow through the coil 36, a rotational magnetic field is developed around the stator core 35. The developed rotational magnetic field and the driving-purpose magnetic poles of the magnet 34 interact with each other, thereby generating a rotational drive force exerted on the magnet 34. Therefore, the magnet 34 and also the hub 10 rotate about the shaft 11.

There is a combination in which doughnut-shaped recording disks 1 coaxially alternate with doughnut-shaped spacers 38. The combination of the recording disks 1 and the spacers 38 may be placed on the ledge (the shelf) of the hub 10. The clamper 39 takes a shape of an approximately doughnut. In FIG. 2, the clamper 39 may be placed on the uppermost recording disk 1. The inner circumference of the clamper 39 may engage with the second cylindrical portion of the hub 10. The clamper 39 may be fixed to the hub 10 by a screw 40. In these cases, the clamper 39 and the screw 40 cooperate as a mechanism for firmly holding the recording disks 1 on the hub 10.

As shown in FIG. 1, the disk drive device 100 may include a magnetic head 3, a drive unit 4 for the magnetic head 3, a control circuit (not shown) for the magnetic head 3 and the drive unit 4, and other parts.

As shown in FIGS. 1B and 2, the top cover 2 is located at an upper portion of the disk drive device 100. The top cover 2 is made of, for example, an aluminum sheet or a steel plate, and is formed by, for example, pressing. The top cover 2 may be plated to prevent corrosion. An edge of the top cover 2 may have a plurality of holes 2A for accommodating screws 5. A central portion of the top cover 2 may have a hole 2B for accommodating the screw 13. Preferably, the top cover 2 is fixed to the end of the shaft 11 by the screw 13 which has a head in contact with the top cover 2 and which extends into the threaded hole 11A through the hole 2B of the top cover 2 to engage with the shaft 11. As best shown in FIG. 1, the wall portion 12B of the base 12 has holes 12F corresponding to the holes 2A in the top cover 2. The top cover 2 may be fixed to the base 12 by the screws 5 which have heads in contact with the top cover 2 and which extend into the respective holes 12F in the base 12 through the respective holes 2A in the top cover 2 to engage with the wall portion 12B of the base 12. Thus, in these cases, one end of the shaft 11 of the FDB 50 is directly fixed to the base 12 while the other end thereof is fixed to the base 12 through the top cover 2. Accordingly, the shaft 11 of the FDB 50 is stably and firmly supported so that vibration of the shaft 11 is effectively suppressed. Therefore, it is possible to reduce a disturbance in the tracing of a recording track on a currently-accessed recording disk 1 by the magnetic head 3 which is caused by vibration of the shaft 11.

A method of assembling the disk drive device 100 includes a sequence of steps (1)-(4) mentioned below.

Figure 5A:
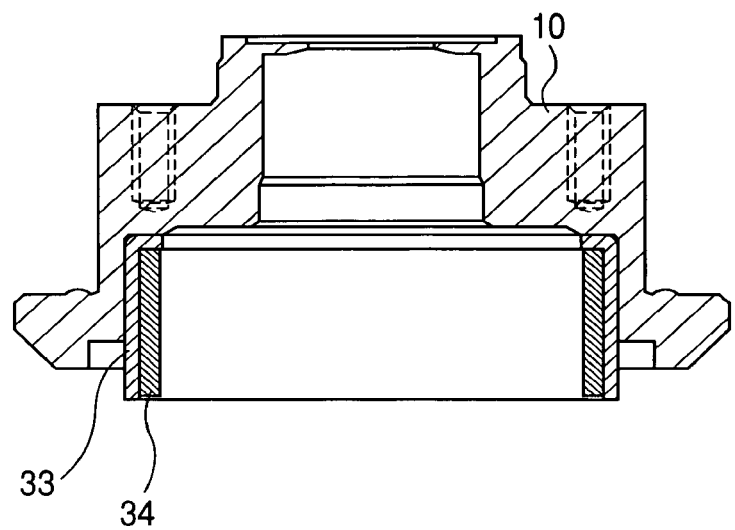
FIG. 5A is a longitudinal section view of a combination of parts in a state where a yoke and a magnet are fixed to an inner circumferential surface of a hub during the assembly of the disk drive device.

(1) With reference to FIG. 5A, a hub 10, a yoke 33, and a basic member for a magnet 34 are prepared. The outer circumferential surface of the yoke 33 is fixed to the fourth cylindrical portion of the hub 10 by, for example, pressing and bond. The outer circumferential surface of the magnet basic member is fixed to the inner circumferential surface of the yoke 33 by, for example, bond. The magnet basic member is magnetized by a magnetizing device (not shown) so that the magnet basic member changes into a magnet 34 having driving-purpose magnetic poles spaced along the circumferential direction of the inner circumferential surface thereof.

Figure 5B:
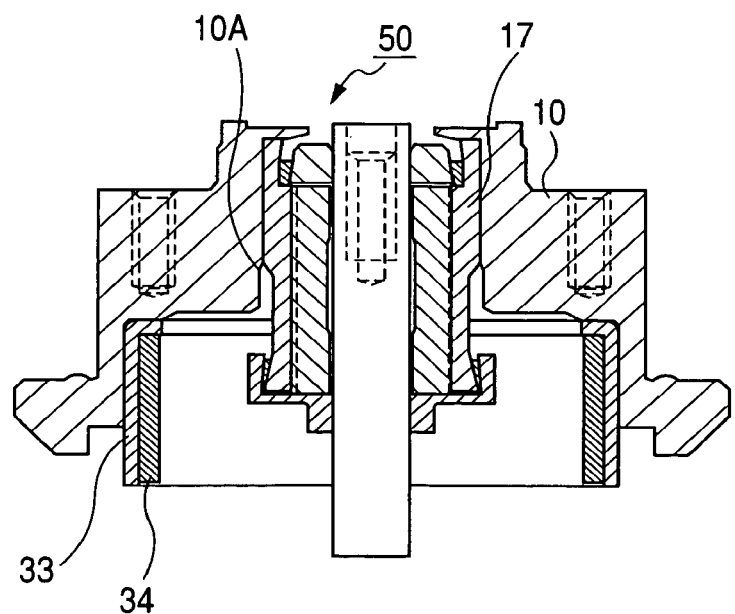
FIG. 5B is a longitudinal section view of a combination of parts in a state where an outer circumferential surface of the FDB is fixed to an inner circumferential surface of the hub during the assembly of the disk drive device.

(2) With reference to FIG. 5B, an FDB 50 is prepared. The FDB 50 is inserted into the central bore of the hub 10. The outer circumferential surface of the second sleeve 17 in the FDB 50 is fixed to the third cylindrical portion of the hub 10 by, for example, bond.

Figure 5C:
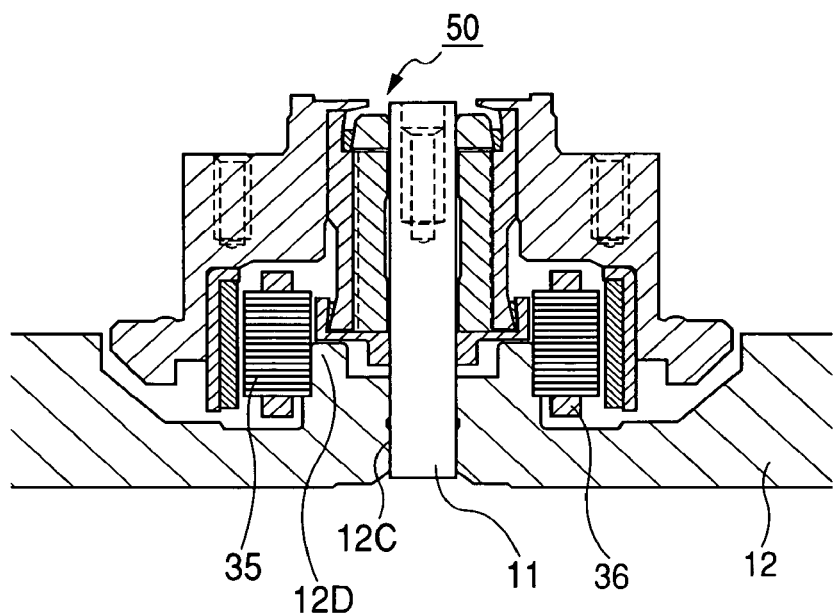
FIG. 5C is a longitudinal section view of a combination of parts in a state where the FDB shaft is fixed to a base during the assembly of the disk drive device.

(3) With reference to FIG. 5C, a stator core 35 is prepared. A coil 36 is formed on the projections of the stator core 35. The stator core 35 is fixed to the outer circumferential surface of the annular wall portion 12D of a base 12 by, for example, bond. At the same time, an end of the shaft 11 of the FDB 50 which is close to the second flange 16 is inserted into the hole 12C of the base 12 and is fixed to the wall of the base 12 by, for example, bond.

Figure 5D:
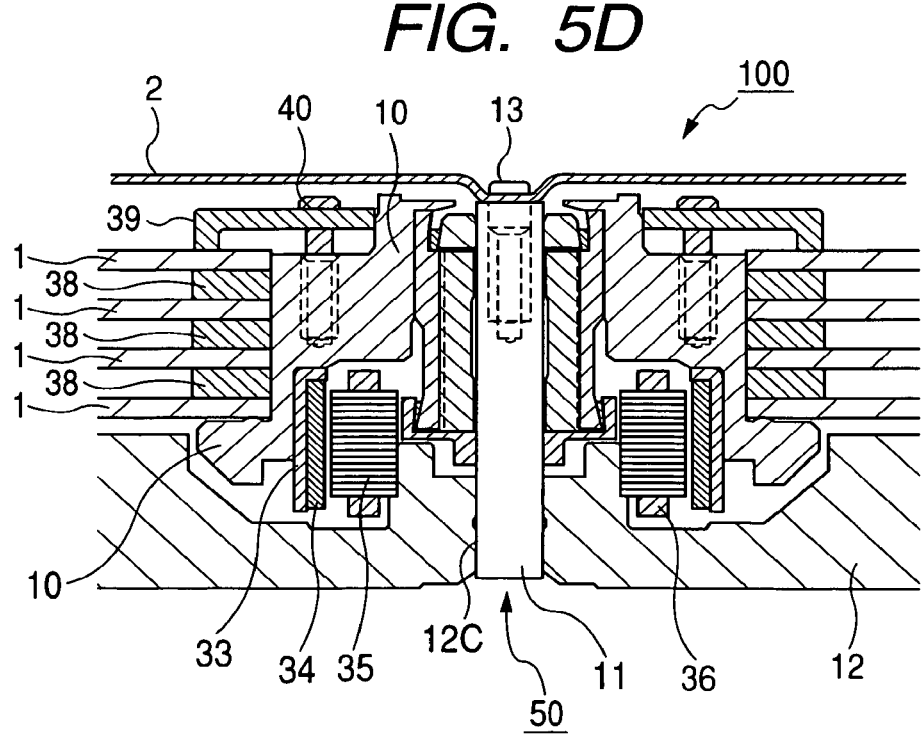
FIG. 5D is a longitudinal section view of a combination of parts in a state where recording disks, spacers, and a clamper are fixed to the hub, and a top cover is securely located in position during the assembly of the disk drive device.

(4) With reference to FIG. 5D, recording disks 1, spacers 38, a clamper 39, and a top cover 2 are prepared. An alternation of the recording disks 1 and the spacers 38 is placed on the ledge (the shelf) of the hub 10. The inner circumference of the clamper 39 is brought into engagement with the second cylindrical portion of the hub 10, and is placed on the uppermost recording disk 1. The clamper 39 is fixed to the hub 10 by a screw 40.

With reference back to FIG. 2, "X" denotes the axial dimension of a portion of the hub 10 which is located at a radial position equal to that of the coil 36 and hence axially aligns with the coil 36, and "Y" denotes the axial dimension of a portion of the base 12 which is located at a radial position equal to that of the coil 36 and hence axially aligns with the coil 36. Preferably, the axial dimension "X" is greater than the axial dimension "Y". In this case, it is possible to provide the advantage that the rocking-mode resonance frequency of the disk drive device 100 is relatively high, and hence unwanted vibration can be suppressed. More preferably, the axial dimensions "X" and "Y" are chosen to have the relation as "X≥1.5Y". In this case, a higher rocking-mode resonance frequency is obtained. The axial dimensions "X" and "Y" are set to, for example, 6.4 mm and 3.6 mm respectively.

In FIG. 2, "Z" denotes the axial dimension of a portion of the shaft 11 which is directly connected with the base 12. Preferably, the axial dimension "Z" is equal to 20% or more of the overall axial length "L" of the shaft 11. In this case, it is possible to provide the advantage that the connection of the shaft 11 with the base 12 is stable and the strength of the connection is sufficiently high. The axial dimension "Z" and the overall axial length "L" of the shaft 11 are set to, for example, 5.4 mm and 23.4 mm respectively.

An inlet side or an entrance side (a lower side in FIG. 2) of the third cylindrical portion of the hub 10 may be formed with a tapered surface 10A. During the step (2) of FIG. 5B, the tapered surface 10A serves as a guide when the FDB 50 is inserted into the third cylindrical portion of the hub 10. Specifically, the second sleeve 17 of the FDB 50 is easily and smoothly moved into the third cylindrical portion of the hub 10 while being guided by the tapered surface 10A. Therefore, the efficiency of the work is relatively high, and the FDB 50 is accurately mounted on the hub 50.

The end (the upper end in FIG. 2) of the hub 10 may be provided with an annular cover member 41 projecting radially inward. The cover member 41 conceals the open end of the first capillary seal 24. The cover member 41 blocks or reduces the escape of the lubricant 23 from the first capillary seal 24 which occurs when a shock is applied to the FDB 50. Preferably, the inside diameter of the cover member 41 is smaller than the outside diameter of the first flange 15. In this case, the cover member 41 can more effectively block or reduce the escape of the lubricant 23 from the first capillary seal 24.

The cover member 41 is made of a material selected from, for example, various metal materials and plastic materials. Preferably, the cover member 41 is made of stainless steel such as SUS303, and is formed by cutting or machining. In this case, the following advantages are provided. The cutting or the machining is easy, and the accuracy thereof is high. The cover member 41 may be made of stainless steel such as SUS304, and may be formed by pressing. In this case, it is possible to provide the advantage that forming the cover member 41 takes a short time.

The cover member 41 may be integral with the hub 10. In this case, it is possible to provide the advantage that the cover member 41 and the hub 10 can be made simultaneously by common steps.

What is claimed is:

1. A disk drive device comprising:
   a base;
   a top cover fixed to the base;
   a rotator that rotates between the base and the top cover;
   a sleeve which has a plated surface and which rotates together with the rotator;
   a shaft assembly comprising a shaft retained in the sleeve in a freely rotatable manner relative to the sleeve, a first flange fixed to the shaft at a location facing with a first end surface of the sleeve with a clearance, and a second flange including an opposed surface facing with a second end surface of the sleeve with a clearance, one end of the shaft assembly being fixed to the base, and another end of the shaft assembly being provided to the top cover in a fixed manner;
   a first annular member which rotates together with the rotator and which surrounds an outer circumferential surface of the first flange;
   a second annular member which is provided to the second flange in a fixed manner and which surrounds at least a part of an outer circumferential surface of the sleeve;
   a radial dynamic pressure groove that is provided in at least one of an outer circumferential surface of the shaft and an inner circumferential surface of the sleeve;
   a thrust dynamic pressure groove that is provided in at least one of a surface of the first flange facing with the sleeve, the first end surface of the sleeve, a surface of the second flange facing with the sleeve, and the second end surface of the sleeve;
   a first capillary seal formed in a clearance between the first flange and the first annular member;
   a second capillary seal formed in a clearance between the second annular member and the sleeve;
   a lubricant filled in the radial dynamic pressure groove and the thrust dynamic pressure groove between the first capillary seal and the second capillary seal;
   a magnet provided to the rotator;
   an annular wall portion which protrudes toward the rotator in an axial direction and which is provided on the base separately from the second annular member; and
   a stator core which is fixed to an outer circumferential surface of the annular wall portion and which faces with the magnet in a radial direction.

2. The disk drive device according to claim 1, wherein the magnet is surrounded by a plated portion.

3. The disk drive device according to claim 1, wherein the top cover is fixed to the shaft assembly by causing a screw that passes all the way through a cover hole provided in the top cover to be threaded with a screw hole provided in an end surface of the shaft assembly.

4. The disk drive device according to claim 3, wherein
   the top cover comprises a cover protrusive part which is an area surrounding the cover hole and which protrudes toward the shaft assembly in the axial direction to form an inward hollow, and
   the screw is at least partially retained in the hollow of the cover protrusive part.

5. The disk drive device according to claim 4, wherein
   the top cover is formed of an aluminum sheet or a steel sheet, and
   the cover protrusive part comprises an embossed part formed by pressing.

6. The disk drive device according to claim 1, wherein the second capillary seal is disposed outwardly of the first capillary seal in a radial direction.

7. The disk drive device according to claim 1, wherein
   the sleeve is provided with a recess in an outer circumferential surface of the sleeve in a radial direction, and
   the second capillary seal is formed in an outer circumference of the recess.

8. The disk drive device according to claim 1, wherein at least one of the first annular member and the second annular member comprises an inner circumferential surface tapered in an inward direction.

9. The disk drive device according to claim 1, wherein
   the sleeve comprises a communication passage of the lubricant which is in communication between a first opening provided in the first end surface and a second opening provided in the second end surface,
   the first opening is located inwardly of an outer circumferential surface of the first flange in a radial direction, and
   the second opening is located inwardly of an inner circumferential surface of the annular wall portion in the radial direction.

10. The disk drive device according to claim 1, wherein an outer diameter of the first annular member is smaller than an outer diameter of the second annular member.

11. The disk drive device according to claim 1, further comprising a cover member which rotates together with the rotator and which covers an open end of the first capillary seal.

12. The disk drive device according to claim 1, wherein the base comprises an encircling wall that encircles a part of an outer circumferential surface of the rotator near the base.

13. The disk drive device according to claim 1, wherein a volume of the second capillary seal is equal to 70 to 130% of a volume of the first capillary seal.

14. A disk drive device comprising:
    a base;
    a top cover fixed to the base;
    a rotator that rotates between the base and the top cover;
    a sleeve that rotates together with the rotator;
    a shaft assembly comprising a shaft retained in the sleeve in a freely rotatable manner relative to the sleeve, a first flange fixed to the shaft at a location facing with a first end surface of the sleeve with a clearance, and a second flange including an opposed surface facing with a second end surface of the sleeve with a clearance, one end of the shaft assembly being fixed to the base, and another end of the shaft assembly being provided to the top cover in a fixed manner;

a first annular member which rotates together with the rotator and which surrounds an outer circumferential surface of the first flange;

a second annular member which is provided to the second flange in a fixed manner and which surrounds at least a part of an outer circumferential surface of the sleeve;

a radial dynamic pressure groove that is provided in at least one of an outer circumferential surface of the shaft and an inner circumferential surface of the sleeve;

a thrust dynamic pressure groove that is provided in at least one of a surface of the first flange facing with the sleeve, the first end surface of the sleeve, a surface of the second flange facing with the sleeve, and the second end surface of the sleeve;

a first capillary seal formed in a clearance between the first flange and the first annular member;

a second capillary seal formed in a clearance between the second annular member and the sleeve; and a lubricant filled in the radial dynamic pressure groove and the thrust dynamic pressure groove between the first capillary seal and the second capillary seal, the top cover comprising a cover protrusive part which is an area corresponding to the shaft assembly and which protrudes toward the shaft assembly to form an inward hollow in an axial direction, the top cover being fixed by causing a first fastener that passes all the way through the top cover to be engaged with a second fastener provided in an end surface of the shaft assembly, and the first fastener being at least partially retained in the hollow of the cover protrusive part.

15. The disk drive device according to claim 14, further comprising a cover member which is located between the top cover and the first flange in the axial direction and which covers an open end of the first capillary seal.

16. The disk drive device according to claim 14, wherein the sleeve comprises a communication passage of the lubricant which is in communication between a first opening provided in the first end surface and a second opening provided in the second end surface,
the first opening is located inwardly of an outer circumferential surface of the first flange in a radial direction, and
the second opening is located inwardly of an inner circumferential surface of the second annular member in the radial direction.

17. A disk drive device comprising:
a base;
a top cover fixed to the base;
a rotator that rotates between the base and the top cover;
a sleeve that rotates together with the rotator;
a shaft assembly comprising a shaft retained in the sleeve in a freely rotatable manner relative to the sleeve, a first flange fixed to the shaft at a location facing with a first end surface of the sleeve with a clearance, and a second flange including an opposed surface facing with a second end surface of the sleeve with a clearance, one end of the shaft assembly being fixed to the base, and another end of the shaft assembly being provided to the top cover in a fixed manner;

a first annular member which rotates together with the rotator and which surrounds an outer circumferential surface of the first flange;

a second annular member which is provided to the second flange in a fixed manner and which surrounds at least a part of an outer circumferential surface of the sleeve;

a radial dynamic pressure groove that is provided in at least one of an outer circumferential surface of the shaft and an inner circumferential surface of the sleeve;

a thrust dynamic pressure groove that is provided in at least one of a surface of the first flange facing with the sleeve, the first end surface of the sleeve, a surface of the second flange facing with the sleeve, and the second end surface of the sleeve;

a first capillary seal formed in a clearance between the first flange and the first annular member;

a second capillary seal formed in a clearance between the second annular member and the sleeve;

a lubricant filled in the radial dynamic pressure groove and the thrust dynamic pressure groove between the first capillary seal and the second capillary seal;

an annular wall portion which protrudes toward the rotator in an axial direction and which is provided on the base separately from the second annular member; and a stator core which is fixed to an outer circumferential surface of the annular wall portion, at least either one of an inner circumferential surface of the first annular member and an inner circumferential surface of the second annular member being tapered inwardly within a range from equal to or greater than 0.5 degrees to equal to or smaller than 10 degrees.

18. The disk drive device according to claim 17, further comprising a magnet provided to the rotator, surrounded by a plated portion, and facing with the stator core in a radial direction,
wherein the surface of the sleeve is plated.

19. The disk drive device according to claim 17, wherein
the top cover comprises a cover protrusive part which is an area corresponding to the shaft assembly and which protrudes toward the shaft assembly to form an inward hollow in an axial direction,
the top cover is fixed by causing a first fastener that passes all the way through the top cover to be engaged with a second fastener provided in an end surface of the shaft assembly, and
the first fastener is at least partially retained in the hollow of the cover protrusive part.

20. The disk drive device according to claim 17, further comprising a cover member which is located between the top cover and the first flange in the axial direction, rotates together with the rotator, and covers an open end of the first capillary seal.

* * * * *